(12) United States Patent
Hardy et al.

(10) Patent No.: US 7,930,438 B2
(45) Date of Patent: Apr. 19, 2011

(54) INTERROGATE PROCESSING FOR COMPLEX I/O LINK

(75) Inventors: Clint Alan Hardy, Tucson, AZ (US); Roger Gregory Hathorn, Tucson, AZ (US); Matthew Joseph Kalos, Tucson, AZ (US); Beth Ann Peterson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 12/189,573

(22) Filed: Aug. 11, 2008

(65) Prior Publication Data

US 2010/0036982 A1 Feb. 11, 2010

(51) Int. Cl.
*G06F 3/00* (2006.01)
*G06F 15/16* (2006.01)

(52) U.S. Cl. .......................................... 710/1; 709/250
(58) Field of Classification Search ........................ 710/1
See application file for complete search history.

(56) References Cited

U.S. PATENT DOCUMENTS

| | | | |
|---|---|---|---|
| 3,283,306 A | 11/1966 | Patrusky | |
| 3,408,632 A | 10/1968 | Hauck | |
| 3,478,321 A | 11/1969 | Cooper et al. | |
| 3,693,161 A | 9/1972 | Price et al. | |
| 6,078,970 A * | 6/2000 | Nordstrom et al. | 710/19 |
| 6,636,909 B1 * | 10/2003 | Kahn et al. | 710/60 |
| 7,567,514 B2 * | 7/2009 | Kobayashi et al. | 370/236 |
| 7,607,035 B2 * | 10/2009 | Kano et al. | 714/6 |
| 2005/0114562 A1 * | 5/2005 | Barnes et al. | 710/29 |

OTHER PUBLICATIONS

Schricker et al., "Using the High Level Architecture to Implement Selective-Fidelity," IEEE, Proceedings of the 37th Annual Simulation Symposium, 2004, 8 pages.
McCurdy et al., "Breaking the Fidelity Barrier: An Examination of our Current Characterization of Prototypes and an Example of a Mixed-Fidelity Succes," Association for Computing Machinery, 2006, 1-59593-178-3/06/0004, pp. 1233-1242.
Isard et al., "Dryad: Distributed Data-Parallel Programs from Sequential Building Blocks," Association for Computing Machinery, 2007, 978-1-59593-636-3-07/0003, pp. 59-72.

* cited by examiner

*Primary Examiner* — Henry W Tsai
*Assistant Examiner* — Titus Wong
(74) *Attorney, Agent, or Firm* — Griffiths & Seaton PLLC

(57) ABSTRACT

A method for facilitating input/output (I/O) communication for a processing operation is provided. An interrogate command is obtained by an I/O communications adapter. The interrogate command queries for status information of the processing operation to be provided in an interrogate response. A fixed number of resources and a time allocated to the interrogate command is throttled by pre-allocating the fixed number of resources needed for the interrogate command, and maintaining a timestamp for a interrogate message. The interrogate message is forwarded from the I/O communications adapter to a control unit. If the interrogate response is not received by the I/O communications adapter within a limited timeout period as measured by the timestamp, or if the interrogate message is received while the fixed number of pre-allocated resources are in use, the I/O communications adapter returns a busy response indicating the control unit is busy to prevent overrunning the control unit.

11 Claims, 2 Drawing Sheets

INTERROGATE PROCESSING FOR COMPLEX I/O LINK

BACKGROUND OF THE INVENTION

1. Field of the Invention

The present invention relates in general to computers, and more particularly to a reporting mechanism for an input/output (I/O) link handling complex instruction chains.

2. Description of the Related Art

Computers and computer systems are found in a variety of settings in today's society. Computing environments and networks may be found at home, at work, at school, in government, and in other settings. In many computer systems, an operating system (OS) helps to share computer resources (processor, memory, disk space, network bandwidth, etc.) between users and application programs. Operating systems may also control access to the computer system in a security-related function.

Input/output (I/O) operations are used to transfer data between memory and input/output devices of a processing environment. Specifically, data is written from memory to one or more input/output devices, and data is read from one or more input/output devices to memory by executing input/output operations.

To facilitate processing of input/output operations, an input/output subsystem of the processing environment is employed. The input/output subsystem is coupled to main memory and the input/output devices of the processing environment and directs the flow of information between memory and the input/output devices. One example of an input/output subsystem is a channel subsystem. The channel subsystem uses channel paths as communications media. Each channel path includes a channel coupled to a control unit, the control unit being further coupled to one or more input/output devices.

The channel subsystem employs channel command words to transfer data between the input/output devices and memory. A channel command word (CCW) specifies the command to be executed, and for commands initiating certain I/O operations, it designates the memory area associated with the operation, the action to be taken whenever transfer to or from the area is completed, and other options.

During input/output processing, a list of channel command words is fetched from memory by a channel. The channel parses each command from the list of channel command words and forwards a number of the commands, each command in it's own entity, to a control unit (processor) coupled to the channel. The control unit then processes the commands. The channel tracks the state of each command and controls when the next set of commands are to be sent to the control unit for processing. The channel ensures that each command is sent to the control unit in it's own entity. Further, the channel infers certain information associated with processing.

SUMMARY OF THE INVENTION

In input/output (I/O) links handling long and complex chains of instructions to perform various operations in a processing environment, there may be a large number of resources (including the I/O between these resources) that are in play at any given time. These resources may include a variety of hardware, software, or firmware components relating to the operation, or a combination thereof. Consequently, it is desirable to obtain information about the states of these resources and I/O, particularly if a problem develops. To ascertain such status information, an interrogate command may be utilized. In an embodiment including a channel subsystem as described above, the interrogate command may be adapted to pass information to the control unit for logging. The response from the control unit (incorporating status information) may contain control unit information, operation information, device information, engineering data, and the like.

Such an interrogate command as generated by the channel subsystem may not be subject to the same "throttling," or monitoring of resource allocation, as a conventional I/O request from another source. Since a channel could send an individual interrogate command for each I/O device, a significant amount of control unit resources could be consumed to handle the request. Since an interrogate command may be sent after a software timeout, the control unit resources may already be in scarce supply. As a result, if the control unit is overrun with interrogate requests, the resources may be stretched further. Accordingly, a need exists for a reporting mechanism that incorporates throttling of resources to prevent processing devices such as control units from being overrun with requests.

In one embodiment, by way of example only, a method of facilitating input/output (I/O) communication in a processing environment having an I/O link handling complex instruction chains for a processing operation is provided. An interrogate command is obtained by an I/O communications adapter of the processing environment. The interrogate command queries for status information of the processing operation to be provided in an interrogate response. A fixed number of resources and a time allocated to the interrogate command is throttled by pre-allocating the fixed number of resources, selecting at least one of the fixed number of resources for the interrogate command, and maintaining a timestamp for a interrogate message incorporating the interrogate command. The interrogate message is forwarded from the I/O communications adapter to a control unit of the processing environment. If the interrogate response is not received by the I/O communications adapter from the control unit within a limited timeout period as measured by the timestamp, or the interrogate command is received while the fixed number of pre-allocated resources are in use, the I/O communications adapter returns a busy response indicating the control unit is busy to prevent overrunning the control unit.

In an additional embodiment, again by way of example only, a system for facilitating input/output (I/O) communication in a processing environment having an I/O link handling complex instruction chains for a processing operation is provided. An I/O communications adapter of the processing environment is adapted for obtaining an interrogate command. The interrogate command queries for status information of the processing operation to be provided in an interrogate response. A fixed number of resources and a time allocated to the interrogate command is throttled by pre-allocating the fixed number of resources, selecting at least one of the fixed number of resources for the interrogate command, and maintaining a timestamp for a interrogate message incorporating the interrogate command. A control unit of the processing environment is adapted for receiving the interrogate message forwarded from the I/O communications adapter. If the interrogate response is not received by the I/O communications adapter from the control unit within a limited timeout period as measured by the timestamp, or the interrogate command is received while the fixed number of pre-allocated resources are in use, the I/O communications adapter returns a busy response indicating the control unit is busy to prevent overrunning the control unit.

In still another embodiment, again by way of example only, a computer program product for facilitating input/output (I/O) communication in a processing environment having an I/O link handling complex instruction chains for a processing operation is provided. The computer program product comprises a computer-readable storage medium having computer-readable program code portions stored therein. The computer-readable program code portions comprise a first executable portion for obtaining by an I/O communications adapter of the processing environment an interrogate command, the interrogate command querying for status information of the processing operation to be provided in an interrogate response, a second executable portion for throttling a fixed number of resources and a time allocated to the interrogate command by pre-allocating the fixed number of resources, selecting at least one of the fixed number of resources for the interrogate command, and maintaining a timestamp for a interrogate message incorporating the interrogate command, and a third executable portion for forwarding from the I/O communications adapter to a control unit of the processing environment the interrogate message. If the interrogate response is not received by the I/O communications adapter from the control unit within a limited timeout period as measured by the timestamp, or the interrogate command is received while the fixed number of pre-allocated resources are in use, the I/O communications adapter returns a busy response indicating the control unit is busy to prevent overrunning the control unit.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
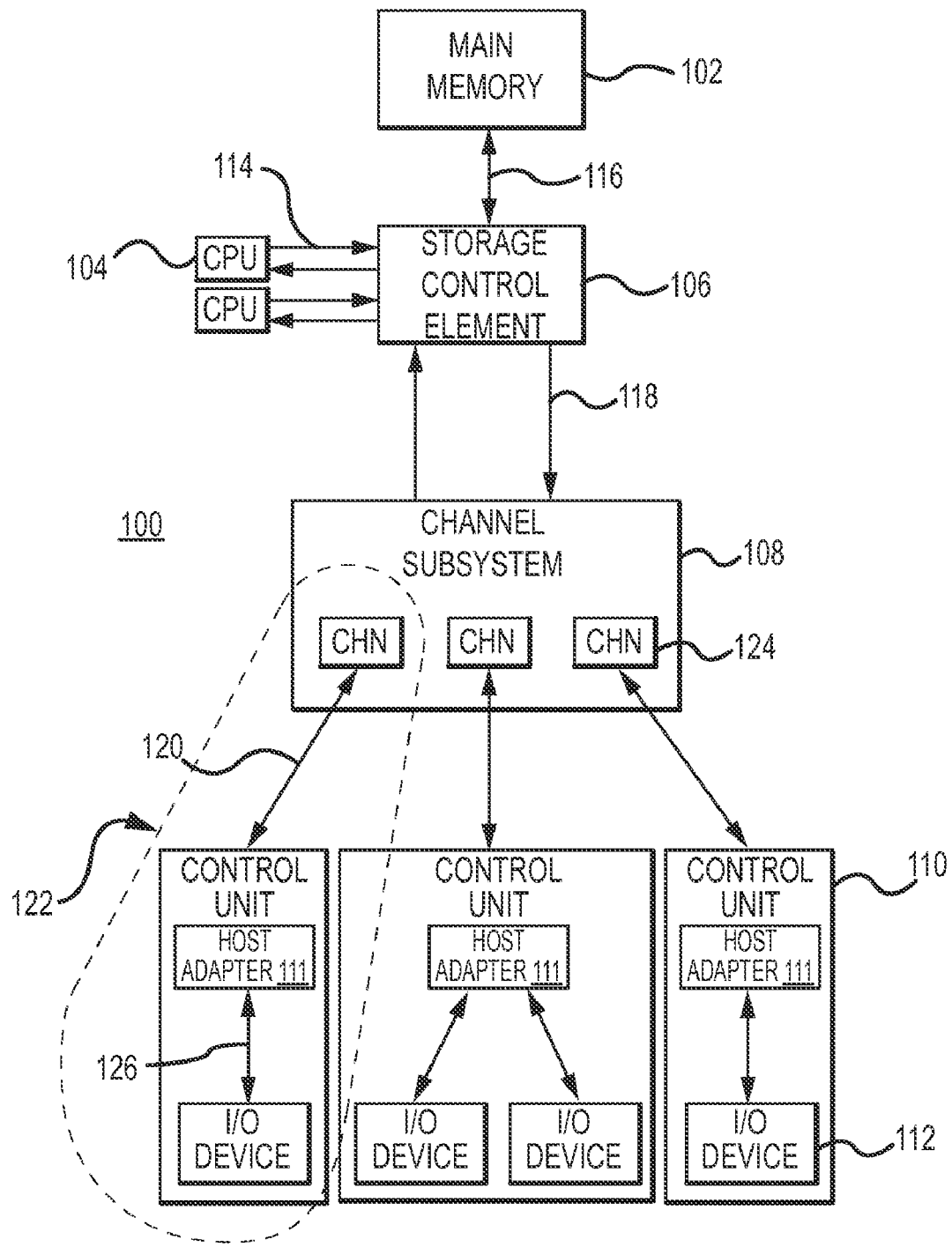
FIG. 1 depicts an exemplary processing environment incorporating and using one or more aspects of the present invention.

I/O link architectures for channel subsystems have evolved to allow control units to queue commands when the control unit has a reserve allegiance to another path group, rather than for the control unit to simply return a "device busy" notification. An interrogate command allows the control unit to return information about a particular processing operation, so that the requester (e.g., software) may determine whether the I/O is stalled due to such a reserve allegiance.

In addition to providing information about whether an I/O is stalled, the interrogate operation is useful in addressing so-called "missing interrupts." Generally speaking, when an operation begins, a timer is started. If the timer expires before the operation completes, the operation is terminated. Missing interrupts may be caused by an overloaded I/O device or controller, conflicts between operations, software or firmware problems, and various error recovery mechanisms. Missing interrupts may also be caused by additional problems. In today's systems, the data collected during such a missing interrupt is not sufficient to determine the root cause of the missing interrupt.

As previously described, while the interrogate operation is useful in providing additional status information, the applicable resources employed to handle the operation may become overrun with interrogate requests if the resources are busy or otherwise in use. The following exemplary embodiments serve to add throttling functionality to the interrogate operation to avoid overrunning the receiving unit. To accomplish such functionality, the resources may be pre-allocated by the sender, and a timestamp affixed to the interrogate mail incorporating the command, so that if the resources are busy or the timeout is exceeded, the sender returns a busy response.

As will be further described, as an I/O communications adapter, such as a host adapter, pre-allocates a fixed number of resources for the interrogate function as an initial step. Once the adapter receives the interrogate command from a requester, the adapter then selects one of the fixed number of pre-allocated resources for the interrogate function. Other processing devices do not allocate resources for the interrogate command. Instead, the interrogate data is gathered when the interrogate mail is dispatched to the control unit. If the interrogate data response cannot be sent or queued to the adapter in a single dispatch, the response is discarded.

The I/O communications adapter contends with a situation where the adapter is unaware whether it will receive an interrogate response from a control unit. As a result, the adapter maintains a timestamp for each interrogate mail. If the response is not received within a timeout period, such as 1.5 seconds, the adapter sends a response to the channel subsystem indicating the control unit is too busy to handle the interrogate command. If the response is later received, the adapter determines that the response is stale because the timestamp in the response doesn't match an outstanding interrogate mail.

If an interrogate is received while all the pre-allocated resources are in use, a response is sent to the channel subsystem indicating the control unit is busy. Some of the pre-allocated resources are dedicated to each port on a multiport adapter, and some portion is kept in a general pool for use by any port on a multiport adapter. Throttling based on pre-allocated resources keeps the channel subsystem from overrunning the control unit with interrogate requests.

One example of a processing environment incorporating and using one or more aspects of the present invention is described with reference to FIG. 1. Processing environment 100 includes, for instance, a main memory 102, one or more central processing units (CPU) 104, a storage control element 106, a channel subsystem 108, one or more control units 110 and one or more input/output (I/O) devices 112, each of which is described below.

Main memory 102 stores data and programs, which are input from input devices 112. Main memory 102 is directly addressable and provides for high-speed processing of data by central processing units 104 and channel subsystem 108.

Central processing unit 104 is the controlling center of environment 100. It contains the sequencing and processing facilities for instruction execution, interruption action, timing functions, initial program loading, and other machine-related functions. Central processing unit 104 is coupled to storage control element 106 via a connection 114, such as a bidirectional or unidirectional bus.

Storage control element 106 is coupled to main memory 102 via a connection 116, such as a bus; to central processing units 104 via connection 114; and to channel subsystem 108 via a connection 118. Storage control element 106 controls, for example, the queuing and execution of requests made by CPU 104 and channel subsystem 108.

Channel subsystem 108 is coupled to storage control element 106, as described above, and to each of the control units via a connection 120, such as a serial link. Channel subsystem 108 directs the flow of information between input/output devices 112 and main memory 102. It relieves the central processing units of the task of communicating directly with the input/output devices and permits data processing to proceed concurrently with input/output processing. The channel subsystem uses one or more channel paths 122 as the communication links in managing the flow of information to or from input/output devices 112. As a part of the input/output processing, channel subsystem 108 also performs the path-management functions of testing for channel path availability, selecting an available channel path and initiating execution of the operation with the input/output devices.

Each channel path 122 includes a channel 124 (channels are located within the channel subsystem, in one example, as shown in FIG. 1), one or more I/O communications adapters (e.g., host adapters) 111, which in the depicted embodiment is located within one or more control units 110, and one or more connections 120. In another example, it is also possible to have one or more dynamic switches as part of the channel path. A dynamic switch is coupled to a channel and a control unit and provides the capability of physically interconnecting any two links that are attached to the switch.

Also located within channel subsystem 108 are subchannels (not shown). One subchannel is provided for and dedicated to each input/output device accessible to a program through the channel subsystem. A subchannel (e.g., a data structure, such as a table) provides the logical appearance of a device to the program. Each subchannel provides information concerning the associated input/output device 112 and its attachment to channel subsystem 108. The subchannel also provides information concerning input/output operations and other functions involving the associated input/output device. The subchannel is the means by which channel subsystem 108 provides information about associated input/output devices 112 to central processing units 104, which obtain this information by executing input/output instructions.

Channel subsystem 108 is coupled to one or more control units 110. The term "control unit" as used herein may refer to a variety of devices and components associated with the processing environment. In the depicted embodiment, for example, the control unit 110 includes one or more input/output devices 112. As a result, reference to a "control unit" may include reference to the input/output devices 112 themselves. In addition, reference to a control unit may include reference to one or more symmetric multi-processors (SMPs) associated with the processing environment. A control unit may refer to additional processing devices associated with input/output devices, or may even refer to a logical entity, as one skilled in the art will appreciate. In the present description and claimed subject matter, however, the term "control unit" is not intended to refer to a host computer or process.

While, in the depicted embodiment, I/O communications adapter 111 is incorporated into control unit 110, reference to a control unit is not intended to refer to adapter 111 specifically (adapter 111 is referenced as such), but to the various other components and devices of the processing environment by which the adapter 111 forms a link interface with, such as input/output devices 112. Each control unit 110 provides the logic to operate and control one or more input/output devices 112 and adapts, through the use of common facilities, the characteristics of each input/output device 112 to the link interface provided by the channel, using the I/O communications adapter 111. The common facilities provide for the execution of input/output operations, indications concerning the status of the control unit, control of the timing of data transfers over the channel path and certain levels of input/output device control.

In the depicted embodiment, within each control unit 110, an adapter 111 is attached via a connection 126 (e.g., a bus) to one or more input/output devices 112. Input/output devices 112 receive information or store information in main memory 102 and/or other memory. Examples of input/output devices include card readers and punches, magnetic tape units, direct access storage devices, displays, keyboards, printers, pointing devices, teleprocessing devices, communication controllers and sensor based equipment, to name a few.

One or more of the above components of the processing environment are further described in "IBM® z/Architecture Principles of Operation," Publication No. SA22-7832-04, 5th Edition, September 2005; U.S. Pat. No. 5,461,721 entitled "System For Transferring Data Between I/O Devices And Main Or Expanded Storage Under Dynamic Control Of Independent Indirect Address Words (IDAWS)," Cormier et al., issued Oct. 24, 1995, which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

Figure 2:
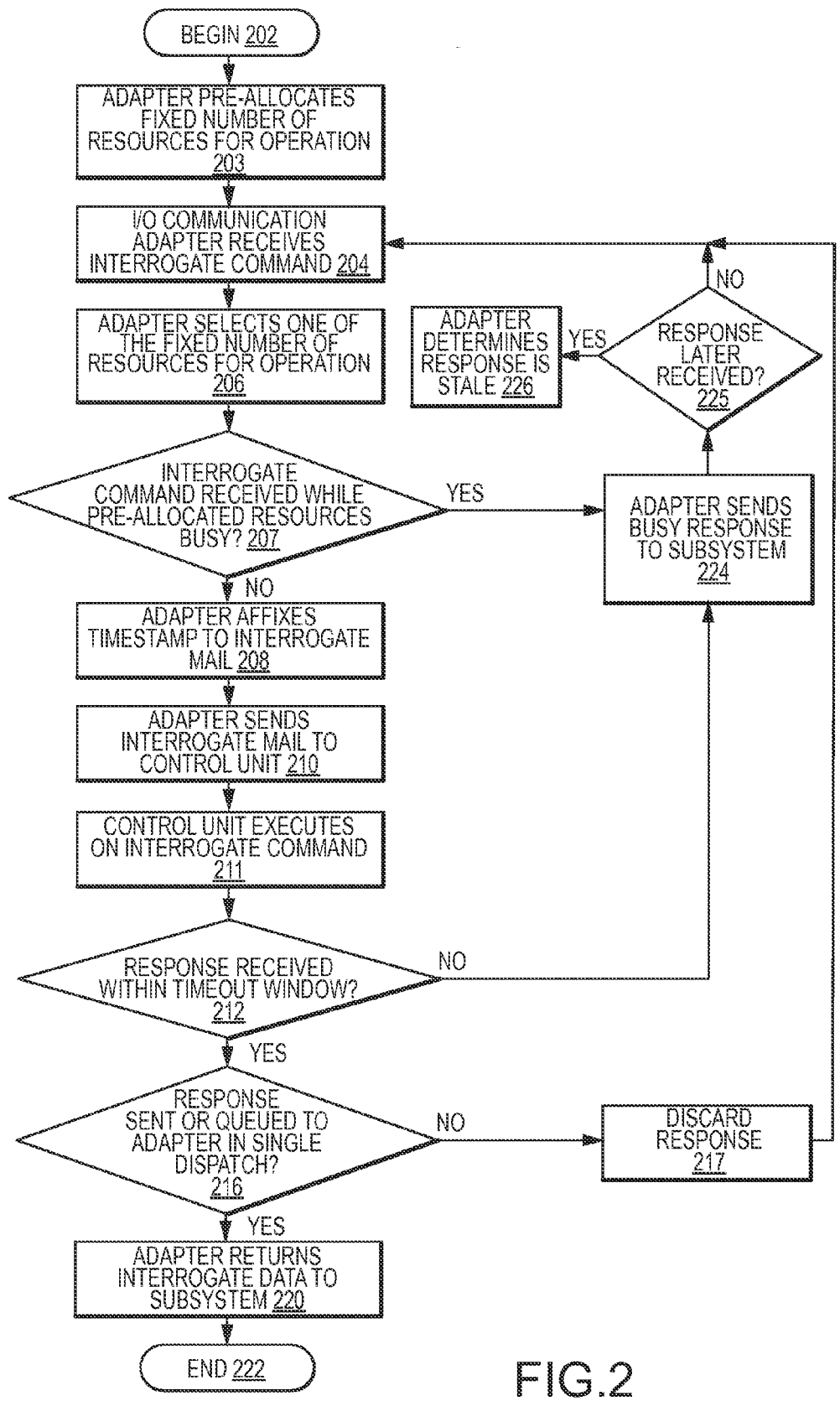
FIG. 2 depicts exemplary interrogate processing incorporating resource throttling according to the present invention.

FIG. 2, following, depicts exemplary interrogate processing incorporating the previously described throttling functionality. As one skilled in the art will appreciate, various steps in the following method may be implemented in differing ways and orders to suit a particular application. In addition, the described method may be implemented by various means, such as hardware, software, firmware, or a combination thereof operational on or otherwise associated with the processing environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

The interrogate processing begins (step 202) with the I/O communications adapter pre-allocating a fixed number of resources (within the adapter) for the interrogate functionality (step 203). At some point following this pre-allocation, the adapter receives an interrogate command (step 204), and selects one of the fixed number of resources for the interrogate operation (step 206). If the interrogate command is received while the selected pre-allocated resource is busy (step 207), then the adapter sends a "too busy" response to the subsystem 224. The adapter then waits for an additional interrogate command to be received (again, step 204).

If the selected resource is not busy, the adapter affixes a timestamp to an interrogate mail incorporating the interrogate command (step 208). The adapter then sends/forwards the interrogate mail to a control unit (step 210), such as an input/output device or an SMP processor. The control unit, again such as the I/O device, then executes on the interrogate command (step 211). If an interrogate response is received within a timeout window (e.g., 1.5 seconds) (step 212), the interrogate status information is provided to the adapter in an interrogate response. This status information is returned to the requesting entity, such as the channel subsystem (step 220), and the interrogate processing ends (step 222).

If, however, an interrogate response is not received within the timeout window (again, step 212), the adapter again sends the "too busy" response to the requesting entity, again such as the channel subsystem (step 224). If a response is later received (step 225), then the adapter is aware that the response is stale (step 226). The adapter then later receives an additional interrogate command and processing continues (step 204).

Additionally, if, when the interrogate command is received by the control unit, the control unit is unable to send or queue the interrogate data response to the adapter in a single dispatch (step 216), the response is discarded (step 217) (in one embodiment by an associated SMP processor) and interrogate processing continues (again, step 204).

As previously described, the status information provided as a result of an interrogate includes various indications that aid in debugging conditions, such as a missing interrupt condition. In addition, the status information may provide data relating to the interrogate mechanism itself.

Exemplary status information includes the following. For extent conflicts, the control unit may report the path group of the first command (the oldest command) that caused the extent conflict. Accordingly, the information may include this path group. The information may also include the number of free control blocks for free operations, an internal state identification for the I/O in question, the number of interrogate operations active on the port and on the adapter, the detailed state of the redundant array of independent disks (RAID) arrays on which a current track in the volume resides, the number of commands active on the RAID array, the number of buffers allocated on the adapter, the number of buffers queued for transmission on the adapter, and device-dependant data as defined by the control unit, such as disconnection reasons for a disconnected task. As the skilled artisan will appreciate, the status information may be modified to include additional information or may vary for a specific implementation.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method of facilitating input/output (I/O) communication in a processing environment having an I/O link handling complex instruction chains for a processing operation, the method comprising: obtaining by an I/O communications adapter of the processing environment an interrogate command, the interrogate command querying for status information of the processing operation to be provided in an interrogate response; throttling a fixed number of resources and a time allocated to the interrogate command by pre-allocating the fixed number of resources, selecting at least one of the fixed number of resources for the interrogate command, and maintaining a timestamp for a interrogate message incorporating the interrogate command; and forwarding from the I/O communications adapter to a control unit of the processing environment the interrogate message, wherein: if the interrogate response is not received by the I/O communications adapter from the control unit within a limited timeout period as measured by the timestamp and the interrogate command is received while the fixed number of pre-allocated resources are in use, the I/O communications adapter returns a busy response indicating the control unit is busy to prevent overrunning the control unit; if the interrogate response is received by the I/O communications adapter from the control unit within a limited timeout period as measured by the timestamp and the interrogate command is received while the fixed number of pre-allocated resources are not in use, returning the interrogate response; if the interrogate response is not received within the limited timeout period, determining that the interrogate response is stale; and if the interrogate response cannot be sent or queued to the I/O communications adapter in a single dispatch, the interrogate response is discarded.

2. The method of claim 1, wherein querying for status information includes at least one of:
   for an extent conflict, querying for a path group of a first command that caused the extent conflict,
   querying for a number of free control blocks for free operations,
   querying for an internal state identification, and
   querying for a number of interrogate operations active on a port and a number of interrogate operations active on the I/O communications adapter.

3. The method of claim 1, wherein querying for status information includes querying for a state of redundant array of independent disks (RAID) arrays on which a current track in a volume resides.

4. The method of claim 1, wherein querying for status information includes querying for at least one of a number of commands active on a redundant array of independent disks (RAID) array, a number of buffers allocated on the I/O communications adapter, and a number of buffers queued for transmission on the I/O communications adapter.

5. A system for facilitating input/output (I/O) communication in a processing environment having an I/O link handling complex instruction chains for a processing operation, the method comprising: an I/O communications adapter of the processing environment adapted for: obtaining an interrogate command, the interrogate command querying for status information of the processing operation to be provided in an interrogate response, throttling a fixed number of resources and a time allocated to the interrogate command by pre-allocating the fixed number of resources, selecting at least one of the fixed number of resources for the interrogate command, and maintaining a timestamp for a interrogate message incorporating the interrogate command; and a control unit of the processing environment adapted for receiving the interrogate message forwarded from the I/O communications adapter, wherein: if the interrogate response is not received by the I/O communications adapter from the control unit within a limited timeout period as measured by the timestamp and the interrogate message is received while the fixed number of pre-allocated resources are in use, the I/O communications adapter returns a busy response indicating the control unit is busy to prevent overrunning the control unit; if the interrogate response is received by the I/O communications adapter from the control unit within a limited timeout period as measured by the timestamp and the interrogate command is received while the fixed number of pre-allocated resources are not in use, returning the interrogate response; if the interrogate response is not received within the limited timeout period, determining that the interrogate response is stale; and if the interrogate response cannot be sent or queued to the I/O communications adapter in a single dispatch, the interrogate response is discarded.

6. The system of claim 5, wherein the status information includes at least one of:
   for an extent conflict, a path group of a first command that caused the extent conflict,
   a number of free control blocks for free operations,
   an internal state identification, and
   a number of interrogate operations active on a port and a number of interrogate operations active on the I/O communications adapter.

7. The system of claim 5, wherein the status information includes a state of redundant array of independent disks (RAID) arrays on which a current track in a volume resides.

8. The system of claim 5, wherein the status information includes at least one of a number of commands active on a redundant array of independent disks (RAID) array, a number of buffers allocated on the I/O communications adapter, and a number of buffers queued for transmission on the I/O communications adapter.

9. A computer program product for facilitating input/output (I/O) communication in a processing environment having an I/O link handling complex instruction chains for a processing operation, the computer program product comprising a non-transitory computer-readable storage medium having computer-readable program code portions stored therein, the computer-readable program code portions comprising: a first executable portion for obtaining by an I/O communications adapter of the processing environment an interrogate command, the interrogate command querying for status information of the processing operation to be provided in an interrogate response; a second executable portion for throttling a fixed number of resources and a time allocated to the interrogate command by pre-allocating the fixed number of resources, selecting at least one of the fixed number of resources for the interrogate command, and maintaining a timestamp for a interrogate message incorporating the interrogate command; and a third executable portion for forwarding from the I/O communications adapter to a control unit of the processing environment the interrogate message, wherein: if the interrogate response is not received by the I/O communications adapter from the control unit within a limited timeout period as measured by the timestamp, and the interrogate message is received while the fixed number of pre-allocated resources are in use, the I/O communications adapter returns a busy response indicating the control unit is busy to prevent overrunning the control unit; if the interrogate response is received by the I/O communications adapter from the control unit within a limited timeout period as measured by the timestamp and the interrogate command is received while the fixed number of pre-allocated resources are not in use, returning the interrogate response; if the interrogate response is not received within the limited timeout period, determining that the interrogate response is stale; and if the interrogate response cannot be sent or queued to the I/O communications adapter in a single dispatch, the interrogate response is discarded.

10. The computer program product of claim 9, wherein the status information includes at least one of:
- for an extent conflict, information for a path group of a first command that caused the extent conflict,
- information for a number of free control blocks for free operations,
- information for an internal state identification, and
- information for a number of interrogate operations active on a port and a number of interrogate operations active on the I/O communications adapter.

11. The computer program product of claim 9, wherein the status information includes at least one of a state of redundant array of independent disks (RAID) arrays on which a current track in a volume resides, a number of commands active on a redundant array of independent disks (RAID) array, a number of buffers allocated on the I/O communications adapter, and a number of buffers queued for transmission on the I/O communications adapter.

* * * * *